United States Patent Office 2,730,516
Patented Jan. 10, 1956

2,730,516

WATER SOLUBLE RESINOUS COMPOSITIONS AND PROCESS OF PREPARING SAME

Tzeng Jiueq Suen, New Canaan, and Arthur M. Schiller, Stamford, Conn., assignors to American Cyanamid Company, New York, N. Y., a corporation of Maine No Drawing. Application January 23, 1953,
Serial No. 333,007

12 Claims. (Cl. 260—67.6)

This invention relates to the process of producing resinous products containing sulfonate groups. More particularly this invention relates to the process of producing non-thermosetting permanently water-soluble melamine-formaldehyde resinous compositions modified with an alkali metal salt of sulfurous acid.

Thermosetting resinous compositions prepared from melamine, formaldehyde and a water soluble salt of sulfurous acid are well-known as disclosed in U. S. Patents Nos. 2,407,599 and 2,412,855. The former patent discloses and claims a thermosetting product which is extremely soluble in water. The latter patent discloses a similar resinous composition that has been converted into an infusible, water-insoluble cationic sorbing resin. Many essential differences between the process herein disclosed and its resulting product and the processes and products disclosed in said aforementioned patents exist. As is well-known, a thermosetting material upon application of heat irreversibly transforms into an insoluble and infusible solid. (See "Principles of High-Polymer Theory and Practice" by A. X. Schmidt and C. A. Marlies, McGraw-Hill Book Co. 1948, page 92.)

It is an object of this invention to produce non-thermosetting permanently water-soluble resinous compositions. It is a further object of this invention to produce non-thermosetting resinous compositions. An additional object of this invention is to produce melamine-formaldehyde resinous products containing sulfonate groups which are permanently water-soluble and non-thermosetting. These and other objects will be discussed more fully hereinbelow.

The products of this invention are permanently water-soluble. They cannot be "cured" into an insoluble and infusible state. These new products can be used to replace natural hydrophilic colloids such as gelatin, gum arabic and agar and also semisynthetic products such as sodium carboxylmethyl cellulose. It is also possible in the process of this invention to vary the number of hydrophilic groups at will.

In carrying out the process of this invention various ways may be employed for effecting reaction between the components. Initially we may react melamine and formaldehyde to form methylol melamine and then add an alkali metal salt of sulfurous acid to the reaction mix to introduce sulfonate groups into the product. Or, we may mix all of the reactants and effect condensation between the mixed reactants in a single step process. Alternatively, we may first condense formaldehyde with the alkali metal salt of sulfurous acid and add to the resulting product melamine and effect further condensation between the components. If desired, we may separately partially condense formaldehyde with melamine and formaldehyde with the alkali metal salt of sulfurous acid and then combine the resulting mixtures and effect further condensation.

Any of the alkali metal salts of sulfurous acid which yield bisulfites or sulfites under the condition of the resin forming reactions may be employed in our process. Included in this group are the bisulfites per se, sulfites and mixtures thereof. The alkali metals form group IA of the periodical table which consists of lithium, sodium, potassium, rubidium and cesium. Sodium metabisulfite finds particular employment in this process in view of its low cost and availability.

In effecting the condensation reaction from about 1.75 to about 6 mols of formaldehyde may be employed for each mol of melamine. It is preferred, however, to utilize from about 2 to about 4 mols of formaldehyde for each mol of melamine. The particular alkali metal salts of sulfurous acid which is utilized in the process is so chosen that from about 0.75 to about 2.0 mols of bisulfite (—$HSO_3$) or sulfite (—$SO_3$) are present for each mol of melamine. It is preferred that from about 0.9 to about 1.5 mols of bisulfite or sulfite be present in the reaction product for each mol of melamine.

The extent of polymerization carried out in the instant process is of a very high order and can be controlled by viscosity measurements of the resin solutions. As the final degree of polymerization is very high, the solution viscosity of the desired product cannot be measured at 50% or even 30% resin solids. At such concentrations the solution would not flow. It was found that a resin concentration of 25% or lower can be conveniently used. In actual practice, the resinous syrup is diluted to such concentrations before the final degree of polymerization is reached. It should also be pointed out that being a polyelectrolyte, the viscosity of the resin in water is greatly affected by the presence of salts or electrolytes. It was found that the product of this invention assumes a much higher viscosity at a lower pH than after it is neutralized. The reaction is allowed to proceed until a minimum viscosity at 25° C. of 50 centipoises at 20% concentration of the neutralized resin is reached before the reaction is halted. Of course, the reaction may be allowed to proceed until a soft or incipient gel is formed before neutralization. If a higher molecular weight product is desired, we may redisperse the product in water and effect further polymerization. In any event the gel formed will redisperse and/or dissolve in water. However, to facilitate mechanical operations it is preferred to dilute the resin before gelation occurs.

The operating conditions under which the resinous products of this invention are produced are very critical. It is necessary that the pH of the reaction mixture be carefully controlled to effect the desired properties. A range of pH of between about 1.5 and about 3.7 is necessary during the polymerization of the product. At higher pH's reaction is extremely slow or negligible. At a lower pH formation of insoluble condensates occurs. Any acid or combinations of acid that gives the desired pH may be employed. A temperature range of between about 40° C. and about 55° C. is also necessary during polymerization of the product. At both lower and higher temperatures precipitation or formation of insoluble condensates tend to occur during the polymerization. The polymerization is best carried out at resin concentration of between about 15% and about 25% solids. We have found that at lower concentrations the rate of reaction becomes unduly slow and at higher concentrations precipitation tends to occur. Furthermore, the desired degree of polymerization cannot be obtained at higher concentrations than herein set forth.

In order that those persons skilled in the art may more fully understand the inventive concept herein presented the following examples are set forth for purposes of illustration only unless otherwise indicated in the appended claims.

*Example 1*

Fourteen hundred and sixty (1460) pts. of 37% formalin was adjusted to pH=4.5 and charged to a suitable reaction flask. Seven hundred fifty-six (756) pts. of melamine was added and the mixture heated at 80° C. until a clear solution was formed. The reaction mixture was cooled to 45° C. Five hundred seventy (570) pts. of sodium metabisulfite was added, followed by eight hundred thirty (830) pts. of water. The pH was adjusted with sodium hydroxide solution to 10.5. The reaction mixture was heated at 80°–85° C. for about 90 minutes and then cooled to 50°–55° C. The reaction mixture was then diluted to 20% calculated solids. The pH of the solution was adjusted to 3.34 with hydrochloric acid and the temperature was raised to 50°–55° C. After about 4 hours at 50°–55° C. and 18 hours at room temperature, the solution had formed a soft and incipient gel. The pH was adjusted to 7.9 by the addition of dilute sodium hydroxide and the product reverted to a viscous solution having a viscosity of 125 centipoises when measured as a 20% solids at 25° C.

The syrup was used to treat a Ventura oil well drilling mud. Three (3) pounds of solid per barrel was used. The water loss after 30 minutes was 13.4 ml. The mud viscosity was not affected by the addition of the compound. A control test without the addition of the resinous product gave a water loss figure of 70 ml.

Example 2

Seventeen hundred (1700) parts of 37% formalin was adjusted to a pH of 4.45 and charged into a reaction vessel. Eight hundred and eighty-two (882) parts of melamine was added and the reaction mixture heated at 80° C. until a clear solution was formed. The reaction was then cooled to about 45° C. Six hundred and sixty-five (665) parts of sodium metabisulfite and nine hundred and eighty parts of water were added and the pH was adjusted to 10.5 with 20% sodium hydroxide solution. The reaction mixture was heated at 80°–85° C. until the free bisulfite was less than 0.2% by an iodine titration. The batch was then cooled to 50°–55° C. and diluted with six thousand three hundred and fifty parts of water containing one hundred and fourteen milliliters of conc. sulfuric acid. The pH of the batch was 3.6. The batch was then heated at 50°–55° C. until the viscosity at 50° C. was 280 centipoises as measured by a Brookfield Synchro-Electric Viscosimeter. The reaction mixture was neutralized with 40% sodium hydroxide to a pH of 11. The viscosity of the neutralized resin dropped to 125 centipoises at 25° C. at 20% solids.

When used in a Ventura oil well drilling mud at 3 pounds per barrel, the 30 minute water loss was 11.3 ml. The viscosity of the mud slurry was not increased by the addition of the compound.

Example 3

Four hundred and fifty-four (454) parts of 37% formalin was charged into a suitable reaction vessel. The pH was adjusted to 4.2. Two hundred and fifty-two parts of melamine were added and the batch heated to 80°–85° C. After the melamine dissolved, the batch was cooled to 45°–50° C. One hundred and ninety (190) parts of sodium metabisulfite and three hundred and twenty-four (324) parts of water were added. The pH was adjusted to 10.5 with dilute sodium hydroxide and the temperature increased to 80°–85° C. The reaction was maintained at 80°–85° C. until the unreacted bisulfite content was less than 0.2%. The temperature was then dropped to 50°–55° C. and the batch diluted with eighteen-hundred and thirty-six (1836) parts of water to which thirty-three (33) milliliters of conc. sulfuric acid had been added. The pH was 3.85. It was readjusted to 3.6 by the addition of sulfuric acid. The batch was maintained at 50°–55° C. until the viscosity of the syrup was 1770 centipoises at 50° C. as measured on a Brookfield Synchro-Electric Viscosimeter. It was then neutralized to a pH of 10.4 with 40% sodium hydroxide. The final viscosity of the syrup was 200 centipoises at 25° C. at 20% solids.

Example 4

Three samples of the resin prepared in Example 2 were taken. The pH of the samples were adjusted to (a) 5.2, (b) 7.0 and (c) 10.8. Films were prepared and baked in an oven at 105° C. for 30 minutes. The films were soaked in warm water and the resins dissolved completely.

Example 5

A finely ground ore pulp containing largely quartz, micaceous material, and small amounts of pyrite, with particle size smaller than 200 mesh, at a pulp density about 12–15% solids, was treated with the resin prepared according to Example 2 at a concentration of 0.07 lb. resin solids per ton of ore. A liter of the ore pulp was allowed to settle over a period of 55 minutes, and the volume of the lower layer containing the settled solids noted as follows:

| Time (min.) | Control Test (no resin added) | Resin Added 0.07 lb./ton |
|---|---|---|
| | Cc. | Cc. |
| 5 | 930 | 870 |
| 15 | 800 | 615 |
| 25 | 670 | 425 |
| 35 | 540 | 340 |
| 45 | 440 | 275 |
| 55 | 360 | 255 |

The resin gave a marked increase in settling rate as shown by the above comparative data.

Example 6

The molecular weight of the resin of Example 1 was estimated by both the light scattering method and the electron micrograph method (cf. Benjamin M. Siegel et al., J. Polymer Science, vol. 5, p. 111 (1950)). The former method gave a value of about 5,000,000 while the latter method indicated a range of about 2,000,000–6,000,000.

In addition to the treatment of oil well drilling mud to suppress the water loss the products of this invention also find utility as thickening agents, protective colloids, emulsifying agents and as a settling agent in mineral dressing.

The above disclosure sets forth the conditions under which polymerization is carried out to give to the reaction products the desired properties. In brief the essence of our invention is the discovery that after the sulfonate groups have been introduced into the resinous product, the solution is diluted to a definite solids concentration, the pH is adjusted to a low number and the polymerization is carried out at a low temperature until a minimum viscosity of the neutralized solution has formed. By carefully controlling these particular reaction conditions, the process is obtained that produces resinous compositions possessing the desired properties set forth above.

Attention is directed to our copending application Serial No. 333,008, filed concurrently herewith, wherein the employment of the instant resinous composition as drilling mud additives is claimed.

We claim:
1. A process for preparing a non-thermosetting permanently water-soluble resinous product which comprises reacting as the essential reactants (1) formaldehyde, (2) melamine and (3) an alkali metal salt of sulfurous acid until condensation occurs to form resinous products containing sulfonate groups, further polymerizing said resinous product by diluting the reaction mixture to between about 15% and about 25% solids, adjusting the pH to within the range of between about 1.5 and about 3.7 and heating at a temperature within the range of about 40° C. and about 55° C. not beyond the formation of a soft gel at said pH but at least until the neutralized solution possesses a minimum viscosity of 50 centipoises when measured as a 20% solid at 25° C., the formaldehyde being present in an amount between about 1.75 and about 6 mols per mol of melamine and the alkali metal salt being present in an amount to yield between about 0.75 and about 2.0 mols of bisulfite per mol of melamine.

2. A process for preparing a non-thermosetting permanently water-soluble resinous product which comprises reacting as the essential reactants (1) formaldehyde, (2) melamine and (3) an alkali metal salt of sulfurous acid until condensation occurs to form resinous products containing sulfonate groups, further polymerizing said resinous product by diluting the reaction mixture to between about 15% and about 25% solids, adjusting the pH to within the range of between about 1.5 and about 3.7 and heating at a temperature within the range of about 40° C. and about 55° C. not beyond the formation of a soft gel at said pH but at least until the neutralized solution possesses a minimum viscosity of 50 centipoises when measured as a 20% solid at 25° C., the formaldehyde being present in an amount between about 2 and about 4 mols per mol of melamine and the alkali metal salt being present in an amount to yield between about 0.9 and about 1.5 mols of bisulfite per mol of melamine.

3. A process for preparing a non-thermosetting permanently water-soluble resinous product which comprises reacting as the essential reactants (1) formaldehyde, (2) melamine and (3) sodium metabisulfite until condensation occurs to form resinous products containing sulfonate groups, further polymerizing said resinous product by diluting the reaction mixture to between about 15% and about 25% solids, adjusting the pH to within the range of between about 1.5 and about 3.7 and heating at a temperature within the range of about 40° C. and about 55° C. not beyond the formation of a soft gel at said pH but at least until the neutralized solution possesses a minimum viscosity of 50 centipoises when measured as a 20% solid at 25° C., the formaldehyde being present in an amount between about 1.75 and about 6 mols per mol of melamine and the sodium metabisulfite being present in an amount to yield between about 0.75 and about 2.0 mols of bisulfite per mol of melamine.

4. A process for preparing a non-thermosetting permanently water-soluble resinous product which comprises reacting as the essential reactants (1) formaldehyde, (2) melamine and (3) sodium bisulfite until condensation occurs to form resinous products containing sulfonate groups, further polymerizing said resinous product by diluting the reaction mixture to between about 15% and about 25% solids, adjusting the pH to within the range of between about 1.5 and about 3.7 and heating at a temperature within the range of about 40° C. and about 55° C. not beyond the formation of a soft gel at said pH but at least until the neutralized solution possesses a minimum viscosity of 50 centiposes when measured as a 20% solid at 25° C., the formaldehyde being present in an amount between about 1.75 and about 6 mols per mol of melamine and sodium bisulfite being present in an amount to yield between about 0.75 and about 2.0 mols of bisulfite per mol of melamine.

5. A process for preparing a non-thermosetting permanently water-soluble resinous product which comprises reacting as the essential reactants (1) formaldehyde, (2) melamine and (3) sodium metabisulfite until condensation occurs to form resinous products containing sulfonate groups, further polymerizing said resinous product by diluting the reaction mixture to between about 15% and about 25% solids, adjusting the pH to within the range of between about 1.5 and about 3.7 and heating at a temperature within the range of about 40° C. and about 55° C. not beyond the formation of a soft gel at said pH but at least until the neutralized solution possesses a minimum viscosity of 50 centipoises when measured as a 20% solid at 25° C., the formaldehyde being present in an amount between about 2 and about 4 mols per mol of melamine and the sodium metabisulfite being present in an amount of yield between about 0.9 and about 1.5 mols of bisulfite per mol of melamine.

6. A process for preparing a non-thermosetting permanently water-soluble resinous product which comprises reacting as the essential reactants (1) formaldehyde, (2) melamine and (3) sodium bisulfite until condensation occurs to form resinous products containing sulfonate groups, further polymerizing said resinous product by diluting the reaction mixture to between about 15% and about 25% solids, adjusting the pH to within the range of between about 1.5 and about 3.7 and heating at a temperature within the range of about 40° C. and about 55° C. not beyond the formation of a soft gel at said pH but at least until the neutralized solution possesses a minimum viscosity of 50 centipoises when measured as a 20% solid at 25° C., the formaldehyde being present in an amount between about 2 and about 4 mols per mol of melamine and the sodium bisulfite being present in an amount to yield between about 0.9 and about 1.5 mols of bisulfite per mol of melamine.

7. A non-thermosetting permanently water-soluble resinous product obtained in accordance with claim 1.

8. A non-thermosetting permanently water-soluble resinous product obtained in accordance with claim 2.

9. A non-thermosetting permanently water-soluble resinous product obtained in accordance with claim 3.

10. A non-thermosetting permanently water-soluble resinous product obtained in accordance with claim 4.

11. A non-thermosetting permanently water-soluble resinous product obtained in accordance with claim 5.

12. A non-thermosetting permanently water-soluble resinous product obtained in accordance with claim 6.

References Cited in the file of this patent

UNITED STATES PATENTS

| | | |
|---|---|---|
| 2,619,480 | Lindenfelser et al. | Nov. 25, 1942 |
| 2,623,851 | Salathiel | Dec. 30, 1952 |
| 2,631,128 | Jones | Mar. 10, 1953 |
| 2,633,459 | Blais | Mar. 31, 1953 |